May 2, 1933.                C. B. COTTRELL, 3D                1,907,244
                            SHEET CUTTER AND CREASER
                      Filed May 21, 1931        2 Sheets-Sheet 1
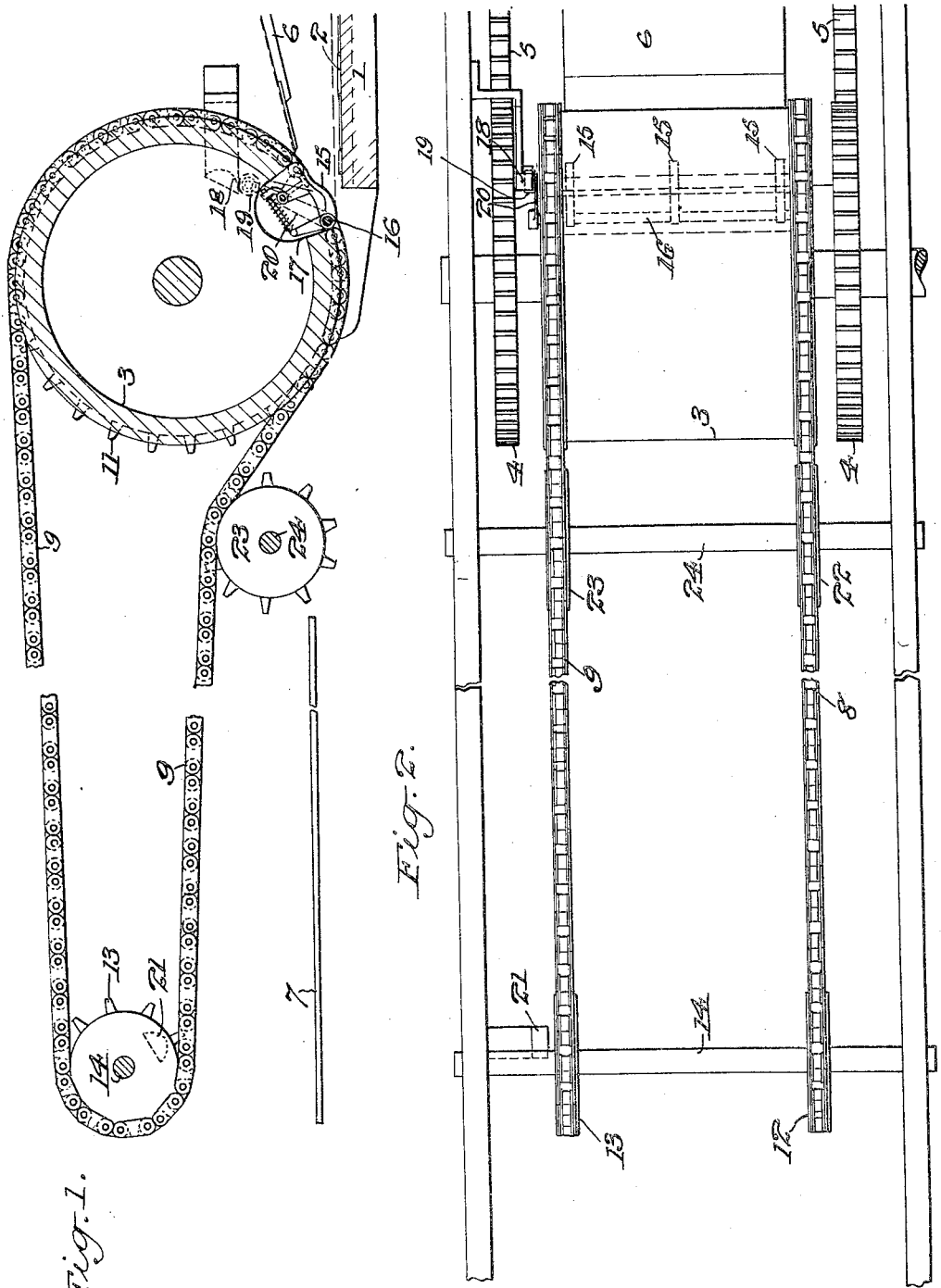

May 2, 1933.  C. B. COTTRELL, 3D  1,907,244
SHEET CUTTER AND CREASER
Filed May 21, 1931   2 Sheets-Sheet 2
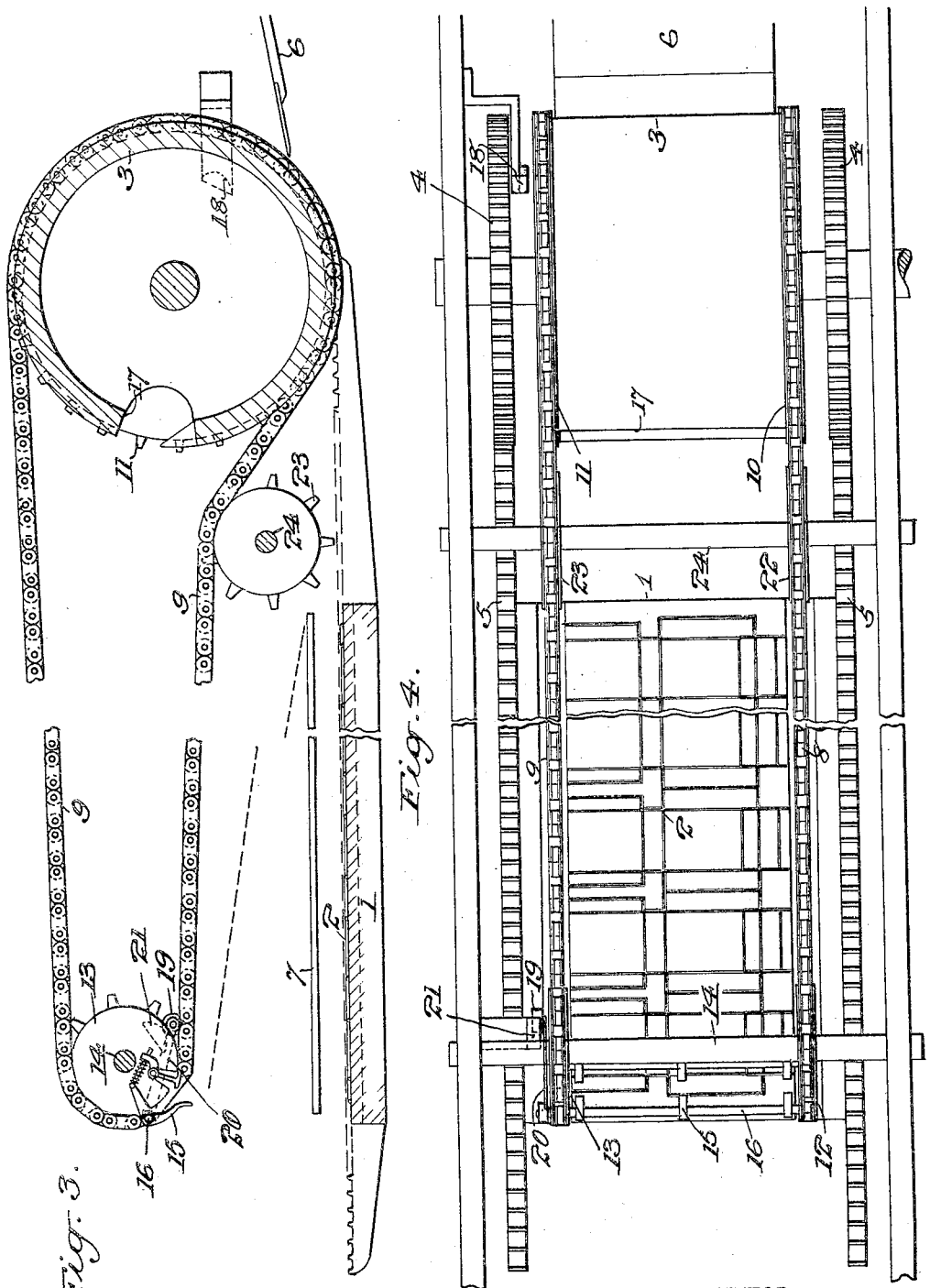
INVENTOR
Calvert B Cottrell 3rd
BY
ATTORNEYS Patented May 2, 1933

1,907,244

UNITED STATES PATENT OFFICE

CALVERT B. COTTRELL, 3D, OF WESTERLY, RHODE ISLAND, ASSIGNOR TO C. B. COTTRELL & SONS COMPANY, OF WESTERLY, RHODE ISLAND, A CORPORATION OF DELAWARE

SHEET CUTTER AND CREASER

Application filed May 21, 1931. Serial No. 538,933.

The object of my invention is to provide certain improvements in a bed and cylinder machine for cutting and creasing sheets to form folding box blanks, whereby the sheets may be cut and creased without unduly bending them, thereby permitting the use of heavy as well as light stock in the machine.

My invention comprises reciprocating means separate from the oscillating impression cylinder for taking a sheet at the under side of the cylinder, carrying the sheet between the coacting form bed and cylinder and delivering the cut and creased sheet to a predetermined point, said means then returning to its original position for taking a succeeding sheet.

My invention more particularly comprises a reciprocating endless carrier driven by the impression cylinder, which carrier passes partway around the cylinder and is provided with grippers which take the sheet at the under side of the cylinder and carry the sheet between the bed and cylinder on the forward movement thereof to the delivery point and there release the sheet.

My invention also comprises means for causing the cut and creased sheet to travel a short distance upwardly with the cylinder before leaving it, for ensuring a clean separation of the sheet from its cutting and creasing form on the reciprocating bed.

A practical embodiment of my invention is represented in the accompanying drawings in which:

Fig. 1 represents a detail vertical longitudinal section through my improved cutter and creaser, the parts being in the positions they assume just after the form bed has started on its forward stroke and the grippers on the reciprocating endless carrier have closed on the leading end of the sheet to be cut and creased;

Fig. 2 represents a top plan view of the same;

Fig. 3 represents a detail vertical longitudinal section through the cutter and creaser, the parts being in the positions they assume just as the bed and endless carrier reach the limits of their forward strokes and the grippers on the endless carrier have been opened to deliver the cut and creased sheet; and Fig. 4 represents a top plan view of the same.

The reciprocating bed 1 bears the sheet cutting and creasing form 2. This form bed may be reciprocated by any well known or approved means, not shown herein.

The oscillating impression cylinder 3 may be driven at all times from the bed by the usual gear and rack connection 4 and 5.

Reciprocating means are provided for taking the sheet at the under side of the cylinder from the feeder 6, carrying the sheet between the cylinder and bed to be cut and creased and delivering the so cut and creased sheet to a predetermined point, such as a delivery table 7.

The means which I have provided for this purpose comprises the following elements: Side chains 8 and 9 of an endless carrier pass around sprocket wheels 10 and 11 on the ends of the impression cylinder 3 and also around the sprocket wheels 12 and 13 on the shaft 14 of a rotary support for the carrier located at a distance to the rear of the impression cylinder 3.

A set of head grippers 15 are carried by a crossbar 16 connecting the sprocket chains 8 and 9, the impression cylinder 3 having a recess 17 in its peripheral surface for receiving the grippers as the bed, cylinder and endless carrier reciprocate.

A fixed cam 18 is located in position to coact with the stud or roller 19 on the gripper arm 20 to first open the grippers 15 as the bed and cylinder start on their forward strokes and then permit the grippers to close onto the leading end of a sheet fed from the feeder 6, to permit the sheet to be carried by the grippers between the bed and cylinder as the bed and cylinder proceed on the forward stroke. This will cause the cutting and creasing form 2 on the bed 1 to cut and crease the sheet. A fixed cam 21 is located in position to coact with the stud or roller 19 on the gripper arm 20 when the grippers reach a position where the tail end of the cut and creased sheet has been freed, to open the grippers to deliver the cut and creased sheet onto the delivery table 7.

To ensure the stripping of the sheet from the form the chains 8 and 9 are caused to pass upwardly from the under side of the cylinder and around sprocket wheels 22, 23 on a cross shaft 24.

From the above description it will be seen that I have provided means whereby the control of the sheet is maintained through its cutting and creasing operation and up to the point where the sheet is to be delivered. It will also be seen that by feeding the sheet to the under side of the impression cylinder and providing the horizontally arranged endless carrier for the sheet any undue bending of the sheet is obviated. It will also be seen that the provision of a separate delivery mechanism for the cut and creased sheet is obviated.

It is evident that various changes may be resorted to in the construction, form and arrangement of the several parts without departing from the spirit and scope of my invention, and hence I do not intend to be limited to the particular embodiment herein shown and described, but

What I claim is:

1. In a sheet cutter and creaser, an oscillating impression cylinder, a reciprocating form bed arranged to coact therewith to cut and crease the sheet on the forward stroke of the bed, and a reciprocating endless carrier operable to take a sheet at the under side of the cylinder, carry the sheet between the bed and cylinder and deliver the cut and creased sheet to a predetermined point.

2. In a sheet cutter and creaser, an oscillating impression cylinder, a reciprocating form bed arranged to coact therewith to cut and crease the sheet on the forward stroke of the bed, and a reciprocating endless carrier driven by the cylinder and operable to take a sheet at the under side of the cylinder, carry the sheet between the bed and cylinder and deliver the cut and creased sheet to a predetermined point.

3. In a sheet cutter and creaser, an oscillating impression cylinder, a reciprocating form bed arranged to coact therewith to cut and crease the sheet on the forward stroke of the bed, and a reciprocating endless carrier passing partway around the cylinder and having grippers operable to take a sheet at the under side of the cylinder, carry the sheet between the bed and cylinder and deliver the cut and creased sheet to a predetermined point.

4. In a sheet cutter and creaser, an oscillating impression cylinder, a reciprocating form bed arranged to coact therewith to cut and crease the sheet on the forward stroke of the bed, a reciprocating endless carrier passing partway around the cylinder and having grippers operable to take a sheet at the under side of the cylinder, carry the sheet between the bed and cylinder and deliver the cut and creased sheet to a predetermined point, and means for causing the sheet to travel a short distance upwardly with the cylinder before leaving it for ensuring the stripping of the sheet from its cutting and creasing form.

5. In a sheet cutter and creaser, an oscillating impression cylinder, a reciprocating form bed arranged to coact therewith to cut and crease the sheet on the forward stroke of the bed, a reciprocating endless carrier passing partway around the cylinder and having grippers operable to take a sheet at the under side of the cylinder, carry the sheet between the bed and cylinder and deliver the cut and creased sheet to a predetermined point, and rotary means over which the endless carrier passes for causing the sheet to travel a short distance upwardly with the cylinder before leaving it for ensuring the stripping of the sheet from its cutting and creasing form.

6. In a sheet cutter and creaser, an oscillating impression cylinder, a reciprocating form bed arranged to coact therewith to cut and crease the sheet on the forward stroke of the bed, a rotary support located a distance rearwardly from the impression cylinder, and a reciprocating endless carrier passing partway around the said cylinder and rotary support, said carrier having head grippers operable to take the leading end of a sheet at the under side of the cylinder, carry the sheet between the bed and cylinder and release the head end of the sheet after its tail end has left the cylinder, to deliver the sheet.

7. In a sheet cutter and creaser, an oscillating impression cylinder, a reciprocating form bed arranged to coact therewith to cut and crease the sheet on the forward stroke of the bed, a rotary support located a distance rearwardly from the impression cylinder, a reciprocating endless carrier passing partway around the said cylinder and rotary support, said carrier having head grippers operable to take the leading end of a sheet at the under side of the cylinder, carry the sheet between the bed and cylinder and release the head end of the sheet after its tail end has left the cylinder, to deliver the sheet, and a rotary carrier adjacent the cylinder and over which the endless carrier passes for causing the sheet to travel a short distance upwardly with the cylinder before leaving it for ensuring the stripping of the sheet from the cutting and creasing form.

In testimony, that I claim the foregoing as my invention, I have signed my name this 8th day of May A. D., 1931.

CALVERT B. COTTRELL, 3D.